(12) United States Patent
Van Dam et al.

(10) Patent No.: US 11,904,273 B2
(45) Date of Patent: Feb. 20, 2024

(54) METHANE AND CARBON DIOXIDE REDUCTION WITH INTEGRATED DIRECT AIR CAPTURE SYSTEMS

(71) Applicant: Baker Hughes Oilfield Operations LLC, Houston, TX (US)

(72) Inventors: Jeremy Van Dam, Oklahoma City, OK (US); Robert Krumm, Oklahoma City, OK (US); Melissa Allin, Oklahoma City, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/739,102

(22) Filed: May 7, 2022

(65) Prior Publication Data

US 2022/0355244 A1    Nov. 10, 2022

Related U.S. Application Data

(60) Provisional application No. 63/186,025, filed on May 7, 2021.

(51) Int. Cl.
*B01D 53/62* (2006.01)
*B01D 53/75* (2006.01)
*B01D 53/78* (2006.01)

(52) U.S. Cl.
CPC ............ *B01D 53/62* (2013.01); *B01D 53/75* (2013.01); *B01D 53/78* (2013.01);
(Continued)

(58) Field of Classification Search
CPC ........ B01D 53/62; B01D 53/75; B01D 53/78; B01D 2251/606; B01D 2257/504;
(Continued)

(56) References Cited

U.S. PATENT DOCUMENTS 8,637,299 B2    1/2014  Heichberger
8,840,706 B1 *  9/2014  Srinivasachar ........ B01D 53/12
                                                              96/108
(Continued)

FOREIGN PATENT DOCUMENTS

CN    2020 073 606 U  * 12/2011
CN     202072492 U    * 12/2011
(Continued)

OTHER PUBLICATIONS

Baciocchi, Renato et al., "Process design and energy requirements for the capture of carbon dioxide from air," Chemical Engineering and Processing, 2006, vol. 45, pp. 1047-1058.
(Continued)

*Primary Examiner* — Timothy C Vanoy
(74) *Attorney, Agent, or Firm* — Crowe & Dunlevy, P.C.

(57) ABSTRACT

A method for capturing carbon from a source of volatile pollutants includes the steps of capturing a mixture of volatile pollutants and air from the source of volatile pollutants, transporting the volatile pollutant-air mixture to an oxidizer module, converting the volatile pollutants into carbon dioxide within the oxidizer module, transporting the carbon dioxide from the oxidizer module to a contactor, loading the carbon dioxide onto sorbents within the contactor, and separating the carbon dioxide from the loaded sorbents to produce a concentrated carbon dioxide product stream. The step of separating the carbon dioxide from the loaded sorbents may optionally include the steps of passing the loaded sorbents to the oxidizer module, and then heating the loaded sorbents in the oxidizer module with the combustion of the mixture of volatile pollutants and air within the oxidizer module to produce the concentrated carbon dioxide product stream while regenerating the sorbents.

21 Claims, 2 Drawing Sheets

(52) U.S. Cl.
CPC .. *B01D 2251/604* (2013.01); *B01D 2251/606* (2013.01); *B01D 2253/204* (2013.01); *B01D 2257/504* (2013.01); *B01D 2258/06* (2013.01)

(58) Field of Classification Search
CPC .......... B01D 2258/06; B01D 2251/604; B01D 2253/204; B01D 2258/0283; Y02C 20/40; Y02E 20/32; Y02E 20/34; C10L 3/104; F23J 2215/50; F23J 2900/15027
See application file for complete search history.

(56) References Cited

U.S. PATENT DOCUMENTS

| | | | | |
|---|---|---|---|---|
| 11,161,076 | B1* | 11/2021 | Van der Walt | B01D 53/1425 |
| 2002/0023538 | A1* | 2/2002 | Agarwal | C10L 3/10 |
| | | | | 96/123 |
| 2008/0138265 | A1* | 6/2008 | Lackner | B01D 53/62 |
| | | | | 422/168 |
| 2013/0255550 | A1* | 10/2013 | Ajhar | B01D 53/72 |
| | | | | 110/211 |
| 2014/0374053 | A1* | 12/2014 | Zhang | F28D 19/04 |
| | | | | 165/8 |
| 2015/0247171 | A1 | 9/2015 | Schultz et al. | |
| 2016/0001260 | A1* | 1/2016 | Tour | B01J 20/28066 |
| | | | | 502/437 |
| 2017/0113184 | A1 | 4/2017 | Eisenberger | |
| 2022/0250002 | A1* | 8/2022 | Moore | B01D 53/1406 |

FOREIGN PATENT DOCUMENTS

| | | | | |
|---|---|---|---|---|
| CN | 102 618 349 B | * | 7/2014 | |
| JP | 2014 031 282 A | * | 2/2014 | |
| WO | WO 2005 046 862 A1 | * | 5/2005 | .............. B01J 20/04 |
| WO | WO 2014 091 024 A1 | * | 6/2014 | .............. C09K 8/594 |
| WO | WO 2014 128 317 A1 | * | 8/2014 | .............. B01D 53/62 |
| WO | WO 2015 046 715 A1 | * | 4/2015 | .............. B01J 20/043 |
| WO | WO 2015 132 437 A1 | * | 9/2015 | .............. B60N 2/2872 |
| WO | 2017190066 A1 | | 11/2017 | |

OTHER PUBLICATIONS

ISA/KR; International Search Report and Written Opinion; PCT/US2022/072175; dated Aug. 24, 2022.

* cited by examiner

METHANE AND CARBON DIOXIDE REDUCTION WITH INTEGRATED DIRECT AIR CAPTURE SYSTEMS

RELATED APPLICATIONS

The present application claims the benefit of U.S. Provisional Patent Application Ser. No. 63/186,025 filed May 7, 2021 and entitled, "Methane and Carbon Dioxide Reduction with Integrated Direct Air Capture Systems," the disclosure of which is herein incorporated by reference.

FIELD OF INVENTION

The present application is generally directed at the field of carbon capture technologies, and more specifically, but not limited to, the use of an integrated system for capturing volatile pollutants and carbon dioxide using direct air capture (DAC) technologies.

BACKGROUND OF THE INVENTION

Volatile pollutants include methane, ethane, higher-order alkanes and the class of chemicals generally referred to as volatile organic compounds (VOCs). The pollutants present both health and environmental concerns. Methane is a particularly problematic greenhouse gas that is released from a variety of natural and manmade sources, including cattle operations, landfills, coal mines, swamps, bogs, and compressors and other industrial equipment powered by natural gas. Research indicates that the atmospheric concentration of methane in the pre-industrial era was about 750 ppb, which increased to about 1860 ppb in 2020. Methane ($CH_4$) is a highly potent greenhouse gas with a global warming potential about 28 times that of carbon dioxide ($CO_2$). Removing methane from the atmosphere is challenging because of its low ambient concentration and low reactivity. Even in the cases of landfill gas or coal mine methane, the concentrations are typically less than about 1%. There have been growing efforts to either mitigate the emissions of methane or convert methane into less environmentally hazardous carbon dioxide.

Existing methane abatement and capture technologies often send methane to a flare or a similar combustion device. Although generally effective at reducing methane, the combustion of methane produces carbon dioxide and other combustion byproducts. One of the challenges with capturing $CO_2$ gas is that it is in such small concentrations that using capital-intensive flue-gas capture equipment becomes impractical. Flue gas $CO_2$ capture processes are generally designed for higher $CO_2$ concentrations ranging from 4-16%.

In contrast, direct air capture (DAC) technologies are designed to reduce the concentration of $CO_2$ in the atmosphere by passing $CO_2$-laden air through a capture device that removes a portion of the $CO_2$ from the air. The DAC process produces a concentrated $CO_2$ "product stream" that can be emplaced in an underground storage facility, or compressed and used for oilfield and other industrial applications. DAC systems are designed for lower $CO_2$ loadings of about 0.04%.

Although a number of companies are exploring commercial applications for DAC-based carbon capture, current DAC technologies are economically challenged due to the high energy costs associated with regeneration of the absorbents used to capture $CO_2$. Additionally, current DAC technologies are less efficient when the concentration of $CO_2$ in the feed stream is very low. These parameters have frustrated the widespread adoption and deployment of DAC systems.

There is, therefore, a need for an improved system for mitigating the release of methane and carbon dioxide into the atmosphere. It is to these and other deficiencies in the prior art that the present invention is directed.

SUMMARY OF THE INVENTION

In some aspects, the present disclosure is directed to a method for capturing carbon from a methane source. The method includes the steps of capturing a methane-air mixture from the methane source, transporting the methane-air mixture to an oxidizer module, converting the methane into carbon dioxide within the oxidizer module, and producing a concentrated carbon dioxide product stream from the carbon dioxide within a capture module. In some embodiments, the step of converting the methane into carbon dioxide within the oxidizer module further includes the step of combusting the methane in a calciner to produce a carbon dioxide exhaust stream.

In another aspect, the present disclosure is directed to a method for capturing carbon and methane from a methane source. The method includes the steps of acquiring a low-concentration methane-air mixture from the methane source, and transporting the low-concentration methane-air mixture to a calciner. The method continues with the step of combusting the low-concentration methane-air mixture within the calciner, where the combustion of the low-concentration methane-air mixture within the calciner produces a carbon dioxide exhaust gas stream.

The method continues with the steps of transporting the carbon dioxide exhaust gas from the calciner to a contactor within the carbon dioxide capture module, feeding an atmospheric mixture of air and carbon dioxide to the contactor, and transferring carbon from the carbon dioxide exhaust gas and the atmospheric mixture of air and carbon dioxide to carbon capture sorbents in the contactor. The method continues with the steps of transferring the carbon capture sorbents loaded with carbon dioxide from the contactor to the calciner, and heating the carbon capture sorbents in the calciner to release carbon dioxide in a concentrated carbon dioxide product stream while regenerating the carbon capture sorbents.

In yet another aspect, the present disclosure is directed to a method for capturing carbon from a source of volatile pollutants. The method includes the steps of capturing a mixture of volatile pollutants and air from the source of volatile pollutants, transporting the volatile pollutant-air mixture to an oxidizer module, converting the volatile pollutants into carbon dioxide within the oxidizer module, transporting the carbon dioxide from the oxidizer module to a contactor, loading the carbon dioxide onto sorbents within the contactor, and separating the carbon dioxide from the loaded sorbents to produce a concentrated carbon dioxide product stream. The step of separating the carbon dioxide from the loaded sorbents may optionally include the steps of passing the loaded sorbents to the oxidizer module, and then heating the loaded sorbents in the oxidizer module with the combustion of the mixture of volatile pollutants and air within the oxidizer module to produce the concentrated carbon dioxide product stream while regenerating the sorbents.

BRIEF DESCRIPTIONS OF THE DRAWINGS

WRITTEN DESCRIPTION

Figure 1:
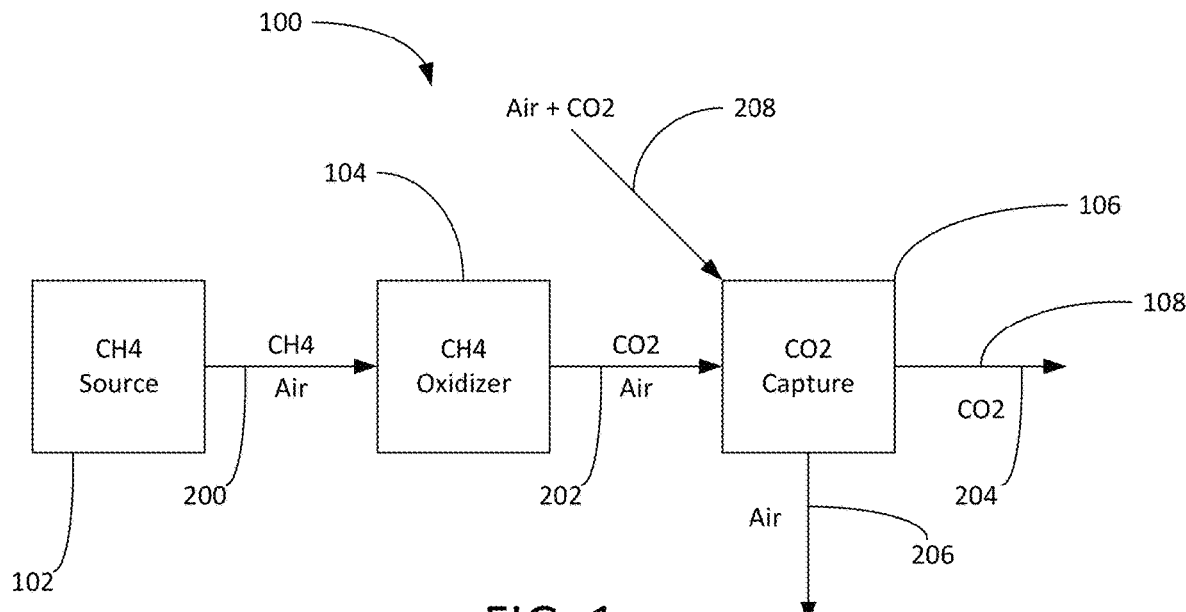
FIG. 1 is a process flow diagram for an integrated methane and carbon dioxide capture system constructed in accordance with an embodiment of the present invention.

FIG. 1 presents a process flow diagram of a methane mitigation system 100. Generally, low-concentration methane ($CH_4$) originating from a methane source 102 is transferred with air through a volatiles feed stream 200 to an oxidizer module 104, where the methane is converted into carbon dioxide ($CO_2$). The resulting low-concentration $CO_2$ and air are passed along as a $CO_2$ exhaust stream 202 to a $CO_2$ capture module 106, where the carbon dioxide is removed and concentrated into a $CO_2$ product stream 204. The remaining air (with a reduced concentration of $CO_2$) is vented to atmosphere from the $CO_2$ capture module 106 through a vent stream 206. In some embodiments, the $CO_2$ capture module 106 also includes an atmospheric feed 208 that includes a low concentration of $CO_2$.

The methane source can be an "open source" in which the low-concentration methane is present in the atmosphere, a "closed source" in which the low-concentration methane is available through a conduit or vessel from an upstream process stream, or a combination of open and closed sources. The methane source may include, for example, landfills, oil and gas operations, refinery operations, coal mines (e.g., ventilation air methane), swamps and bogs, lean burn engines, and cattle and agricultural operations. Two particularly problematic sources of methane include: (i) methane slip from natural gas-fired lean-burn engines found on natural gas compressor stations, which produce as exhaust about 2-5% of feed methane; and (ii) ventilation air methane (VAM), which is exhausted from underground coal mines with insufficient methane abatement equipment.

The oxidizer or "methane elimination" module 104 is configured to convert methane into carbon dioxide. The oxidizer module 104 can employ one or more of the following methane elimination technologies: thermal oxidation, catalytic oxidation, photocatalytic oxidation, electrocatalytic oxidation, and chemical oxidation. In some embodiments, the oxidizer module 104 is configured as a recuperative thermal oxidizer (RTO), which has found widespread commercial use for destroying methane and volatile organic compounds below about 1.5% concentration. Recuperative thermal oxidizers use a ceramic matrix as a heat transfer medium placed before and after the combustion zone. Combustion heats the ceramic and the flow is reversed so that the ceramic-filled sections either pre-heat the gases or recover heat post-combustion.

The oxidizer module 104 may alternatively or additionally include a recuperative catalytic oxidizer (RCO), which is similar to a recuperative thermal oxidizer, but uses a catalyst-impregnated ceramic to maintain combustion at lower temperatures. In other embodiments, the oxidizer module 104 can be configured to eliminate methane by combusting the methane as fuel in gas turbines, internal combustion engines, kilns, boilers and other combustion-based systems that produce a $CO_2$ as a product of the combustion reaction.

In yet other embodiments, the oxidizer module 104 can be configured to employ photocatalytic technologies. Photocatalysis systems include the use of ultraviolet (UV) light (usually around 254 nm) and nano-particle-based catalysts to destroy methane using surface plasmon resonance (SPR). Photocatalysis systems are advantageous because they are generally safer and require a lower operating temperature; but are disadvantageous because they require large surface areas, are expensive and they produce slower reaction rates.

The $CO_2$ capture module 106 can employ one or more of the following technologies to remove $CO_2$ from the output of the oxidizer module 104: liquid sorbent transfer, temperature swing adsorption, and moisture swing adsorption. For example, the $CO_2$ capture module 106 can be configured as a scrubber column in which a liquid solvent is used to selectively absorb $CO_2$ using monoethanolamine (MEA), diethanolamine (DEA) or methyldiethanolamine (MDEA). Other adsorbents may include zeolites or metal-oxide frameworks.

Temperature swing adsorption (TSA) and moisture swing adsorption (MSA) use solid adsorbents to capture $CO_2$ from the air naturally or with fans. Adsorption and regeneration typically take place in the same unit with multiple units alternating between the two operations. Amine functionalized cellulose fibers can be used to adsorb moisture and $CO_2$ from the air. Regenerating the adsorbent is accomplished by drawing a vacuum and heating it to over 100° C., requiring 1500-2000 kWhth/ton $CO_2$. A full cycle of the absorbent system takes 4-6 hours. Other technologies make use of an amino-functionalized polymer adsorbent with an improved cycle time of 30 minutes with regeneration at 85-95° C. (1200-1400 kWhth/ton $CO_2$). Low-pressure steam can be used to regenerate the adsorbent, which makes possible the use of low-temperature waste heat for steam generation.

Alternatively, a solid sorbent can be used to adsorb moisture and $CO_2$ from the air, wherein the solid sorbent is comprised of a Metal Organic Framework (MOF). The MOF may be amine-functionalized to further enhance capture efficiency and reduce the temperature required for regeneration/desorption. In some embodiments, conditioning the $CO_2$ exhaust stream 202 before it reaches the $CO_2$ capture module 106 can improve the adsorption of the $CO_2$ onto the sorbents. For example, it may be helpful to heat the $CO_2$ exhaust stream 202 to about 25° C. and adjust the humidity of the $CO_2$ exhaust stream 202 to about 50% relative humidity to optimize the adsorption of $CO_2$ onto the sorbents within the carbon capture module 106.

Liquid sorption can be accomplished with a regenerative loop with a sodium hydroxide solution (NaOHaq) contacting the air in a contactor or "scrubber." The NaOH reacts with $CO_2$ to generate sodium carbonate (Eqn. 1).

$$2NaOH + CO_2 \rightarrow Na_2CO_3 + H_2O \quad \text{(Eqn. 1)}$$

Eqn. 1 is a simplified generalization of the reactions that take place in the contactor. Reactions in ionic solutions need to account for the equilibrium between ionic species Na+, $HCO_3^{2-}$, OH−, H+, etc. Because sodium carbonate is highly soluble in water, a causticizer is used to react the $Na_2CO_3$ with calcium hydroxide (CaOH) to regenerate the sodium hydroxide and to precipitate calcium carbonate (Eqn. 2). Systems using two carbonates are sometimes referred to as "carbonate looping" systems.

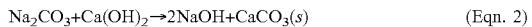
$$Na_2CO_3 + Ca(OH)_2 \rightarrow 2NaOH + CaCO_3(s) \quad \text{(Eqn. 2)}$$

The solid calcium carbonate is heated to 900° C. in a calciner or rotary kiln, which converts the $CaCO_3$ into calcium oxide (CaO), while releasing the captured $CO_2$ (Eqn. 3). This is the most energy intensive step in the process and modern systems require about 1420-2250 kWhth/ton $CO_2$. Released $CO_2$ can then be compressed for pipeline distribution or sequestration as the $CO_2$ product stream 108.

The quicklime (CaO) is hydrated in a slaker unit to create calcium hydroxide (Eqn. 4), which is fed back to the contactor once regenerated.

$$CaCO_3 + heat \rightarrow CaO + CO_2 \quad \text{(Eqn. 3)}$$

$$CaO + H_2O \rightarrow Ca(OH)_2 \quad \text{(Eqn. 4)}$$

Figure 2:
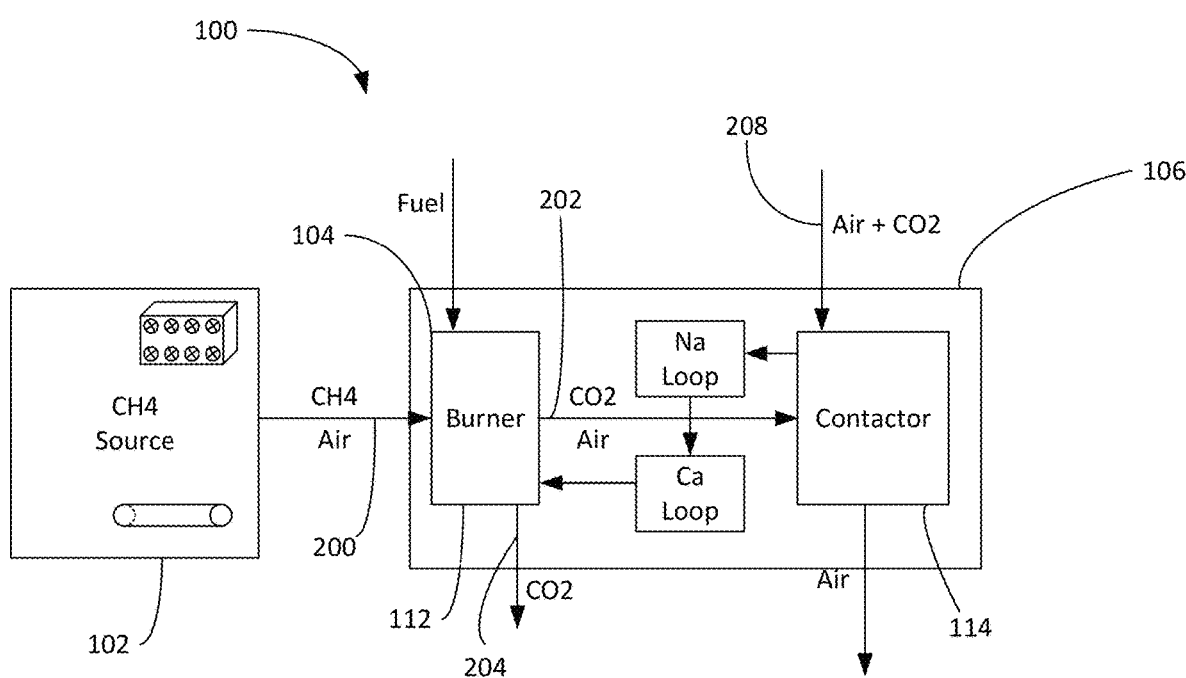
FIG. 2 is a process flow diagram for an alternate embodiment of the integrated methane and carbon dioxide capture system of FIG. 1.
Figure 3:
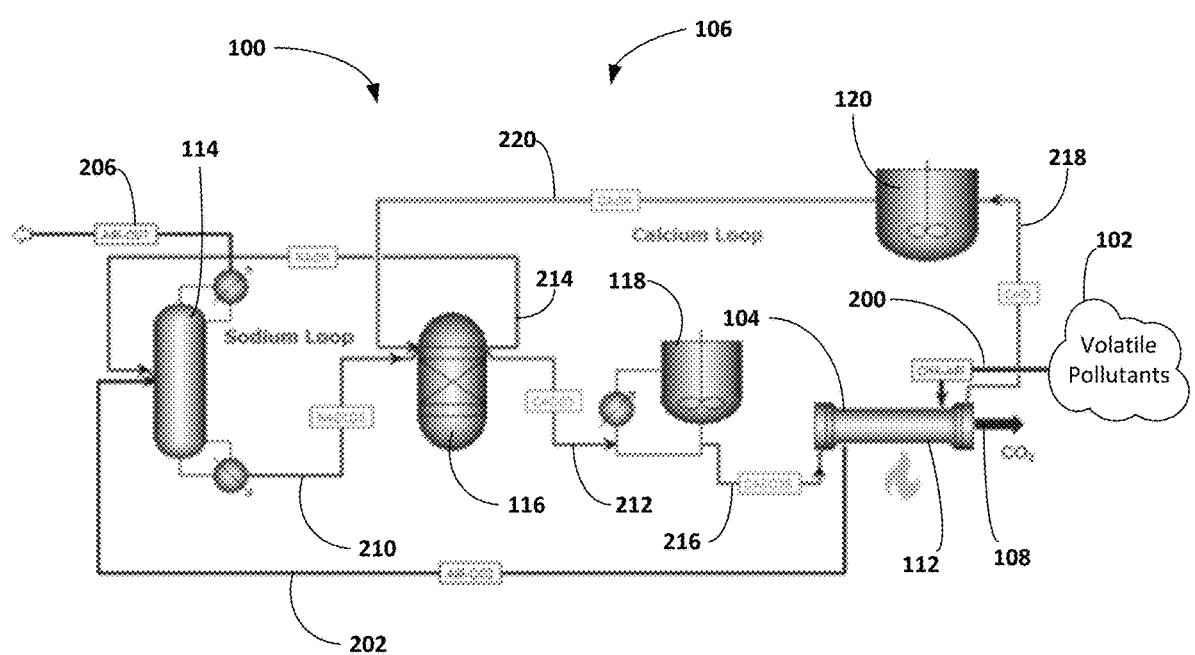
FIG. 3 is a detailed process flow diagram of the integrated methane and carbon dioxide capture system of FIG. 2.

Turning to FIGS. 2 and 3, shown therein are simplified process flow diagrams of embodiments of the methane mitigation system 100 in which the oxidizer (methane elimination) module 104 is integrated within the carbon dioxide capture module 106. In these systems, the open or closed methane source 102 provides a consistent stream of low-concentration methane or other volatiles through the volatiles feed stream 200 to the $CO_2$ integrated capture module 106, in which the volatiles feed stream 200 is processed through the oxidizer module 104 to convert the methane to $CO_2$, which is then captured through a liquid sorbent-based contactor system. The $CO_2$ capture module 106 can be constructed as part of a direct air capture (DAC) system that makes use of the "carbonate looping" technology discussed above to more efficiently process the atmospheric feed stream 208.

Importantly, the oxidizer module 104 includes a calciner 112 or other burner-based heat exchanger that converts the methane into carbon dioxide through a combustion reaction, while providing heat for the regeneration of the calcium oxide (quicklime) from calcium carbonate as part of a carbonate looping process as described above. The low-concentration methane/air mixture from the feed stream 200 is used as a fuel source (primary or supplementary) for the calciner 112. The $CO_2$-laden exhaust stream 202 from the calciner 112 is then passed to a contactor 114, where a portion of the $CO_2$ is captured by the sodium hydroxide sorbent to produce a sodium carbonate product stream 210.

As illustrated in FIG. 3, the carbon is transferred from the sodium carbonate product stream 210 to a calcium hydroxide product stream 212 in a causticizer module 116. The causticizer module 116 returns a sodium hydroxide stream 214 to the contactor 114 and sends the calciner 112 a solid calcium carbonate stream 216. A crystallizer 118 (as depicted in FIG. 3) may be used to convert the liquid calcium carbonate product stream 212 to the solid calcium carbonate stream 216.

Within the calciner 112, the heat releases carbon dioxide from the solid calcium carbonate to regenerate the quicklime. The released $CO_2$ is then directed to the $CO_2$ product stream 204 for sequestration or industrial applications. The regenerated quicklime (CaO) is sent from the calciner 112 to the slaker 120 in a quicklime stream 218. The resulting calcium hydroxide is returned through a calcium hydroxide stream 220 to the causticizer module 116.

Thus, in some embodiments, the methane mitigation system 100 provides an enhanced dual carbon capture system that includes an upstream methane oxidizer module 104 (e.g., calciner 112) that converts methane into carbon dioxide, while providing reaction heat for the regeneration of the sorbent used in the downstream $CO_2$ capture module 106. The exhaust gas from the calciner 112 includes a low-concentration $CO_2$ stream that can be directed to the contactor 114 of the $CO_2$ capture module. The additional $CO_2$ directed from the calciner 112 increases the overall concentration of $CO_2$ at the contactor 114, which improves the kinetics of the $CO_2$ removal process. The novel use of the calciner 112 as the oxidizer module 104 for eliminating methane from the methane source presents significant synergistic benefits by reducing fuel costs, eliminating fugitive $CO_2$ exhaust products from the methane oxidation, and improving the reaction kinetics for the $CO_2$ capture module 106 by increasing the concentration of $CO_2$ at the feedstock to the contactor 114.

Monitoring equipment can be configured to accurately quantify the amount of methane and carbon dioxide captured by the methane mitigation system 100. Tracking the capture of methane and carbon dioxide can yield significant tax credit benefits available for the removal of greenhouse gases.

Although exemplary embodiments are well-suited for mitigating low-concentration methane sources, it will be appreciated that the methane mitigation system 100 can also be used to address higher concentration methane sources (e.g., >30%). High concentration methane sources can be used to generate heat for regenerating the adsorbent/absorbent in the form of dry heat for carbonate looping and temperature swing adsorption or steam for moisture swing absorption. Direct air capture (DAC) technologies can also use high-concentration methane to generate electricity for the $CO_2$ absorption process.

Furthermore, although the methane mitigation system 100 is well suited for removing methane from closed and open sources, it will be appreciated that the system 100 can also be used to remove other volatile pollutants that can be combusted within the heat exchanger 112 to produce a carbon dioxide. As used herein, the term "volatile pollutants" refers generally to hydrocarbon-based compounds, including alkanes such as methane, ethane, butane, and pentane, and the class of chemicals generally referred to as volatile organic compounds (VOCs). In these embodiments, the volatile pollutant or mix of volatile pollutants is captured from open or closed sources and fed through the volatile feed stream 200 to the heat exchanger 112, where the volatile pollutants are used as a primary or supplementary fuel source for the heat exchanger (or calciner) 112.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method for capturing carbon from a methane source, the method comprising the steps of:
   capturing a methane-air mixture from the methane source;
   transporting the methane-air mixture to an oxidizer module;
   converting the methane-air mixture into a carbon dioxide exhaust stream within the oxidizer module; and
   producing a concentrated carbon dioxide product stream from the carbon dioxide exhaust stream within a carbon dioxide capture module.

2. The method of claim 1, wherein the step of capturing the methane-air mixture from the methane source comprises capturing the methane-air mixture from an open source.

3. The method of claim 1, wherein the step of capturing the methane-air mixture from the methane source comprises capturing the methane-air mixture from a closed source.

4. The method of claim 1, wherein step of converting the methane into carbon dioxide within the oxidizer module comprises processing the methane with a methane elimination process selected from the group consisting of catalytic oxidation, photocatalytic oxidation, electro-catalytic oxidation, and chemical oxidation.

5. The method of claim 1, wherein step of converting the methane into carbon dioxide within the oxidizer module comprises processing the methane with a recuperative thermal oxidizer or recuperative catalytic oxidizer.

6. The method of claim 1, wherein step of converting the methane-air mixture into a carbon dioxide exhaust stream within the oxidizer module further comprises combusting the methane-air mixture in a calciner to produce the carbon dioxide exhaust stream.

7. The method of claim 6, wherein the step of producing the concentrated carbon dioxide product stream further comprises:
sending the carbon dioxide exhaust stream to a contactor that includes one or more sorbents;
sending a sodium hydroxide stream to the contactor; and
producing a sodium carbonate product stream from the contactor.

8. The method of claim 7, wherein the step of sending the carbon dioxide exhaust stream (202) to the contactor (114) includes loading the carbon dioxide onto one or more solid Metal Organic Framework (MOF) sorbents.

9. The method of claim 7, wherein the step of producing the concentrated carbon dioxide product stream further comprises:
sending the sodium carbonate product stream to a causticizer module;
sending a calcium hydroxide stream to the causticizer module; and
producing a calcium carbonate product stream from the causticizer module.

10. The method of claim 9, wherein the step of producing the concentrated carbon dioxide product stream further comprises:
sending the calcium carbonate product stream to a crystallizer; and
producing a solid calcium carbonate stream from the crystallizer.

11. The method of claim 10, wherein the step of producing the concentrated carbon dioxide product stream further comprises:
sending the solid calcium carbonate stream to the calciner;
heating the solid calcium carbonate within the calciner to produce the concentrated carbon dioxide stream.

12. The method of claim 11, wherein the step of heating the solid calcium carbonate further comprises the steps of:
heating the solid calcium carbonate within the calciner with energy released from the combustion of the methane-air mixture captured from the methane source; and
producing the concentrated carbon dioxide stream from carbon dioxide released from the solid calcium carbonate heated within the calciner.

13. The method of claim 12, further comprising the step of producing a quicklime stream following the release of the carbon dioxide from the solid calcium carbonate in the calciner.

14. The method of claim 13, further comprising the steps of:
sending the quicklime stream from the calciner to a slaker;
hydrating the quicklime in the slaker; and
producing the calcium hydroxide stream from the hydrated quicklime in the slaker.

15. A method for capturing carbon and methane from a methane source, the method comprising the steps of:
acquiring a low-concentration methane-air mixture from the methane source;
transporting the low-concentration methane-air mixture to a calciner;
combusting the low-concentration methane-air mixture within the calciner, wherein the combustion of the low-concentration methane-air mixture within the calciner produces a carbon dioxide exhaust gas stream;
transporting the carbon dioxide exhaust gas from the calciner to a contactor within the carbon dioxide capture module;
feeding an atmospheric mixture of air and carbon dioxide to the contactor;
transferring carbon from the carbon dioxide exhaust gas and the atmospheric mixture of air and carbon dioxide to carbon capture sorbents in the contactor;
transferring the carbon capture sorbents loaded with carbon dioxide from the contactor to the calciner; and
heating the carbon capture sorbents in the calciner to release carbon dioxide in a concentrated carbon dioxide product stream while regenerating the carbon capture sorbents.

16. The method of claim 15, wherein the step of transferring the carbon capture sorbents loaded with carbon dioxide from the contactor to the calciner comprises:
transferring a sodium carbonate product stream from the contactor to a causticizer module;
converting the sodium carbonate product stream into a calcium carbonate product stream within the causticizer module;
transferring the calcium carbonate product stream to a crystallizer, which converts the calcium carbonate product stream to a solid calcium carbonate stream; and
transferring the solid calcium carbonate stream to the calciner.

17. The method of claim 16, wherein the step of heating the carbon capture sorbents in the calciner further comprises heating the solid calcium carbonate stream to produce the concentrated carbon dioxide product stream.

18. The method of claim 17, wherein the step of heating the carbon capture sorbents in the calciner further comprises heating the solid calcium carbonate stream to produce a quicklime stream.

19. The method of claim 18, further comprising the steps of:
sending the quicklime stream to a slaker;
hydrating the quicklime in the slaker to produce a calcium hydroxide stream; and
passing the calcium hydroxide stream back to the causticizer unit.

20. A method for capturing carbon from a source of volatile pollutants, the method comprising the steps of:
capturing a mixture of volatile pollutants and air from the source of volatile pollutants;
transporting the volatile pollutant-air mixture to an oxidizer module;
converting the volatile pollutants into carbon dioxide within the oxidizer module;
transporting the carbon dioxide from the oxidizer module to a contactor;
loading the carbon dioxide onto sorbents within the contactor;
separating the carbon dioxide from the loaded sorbents to produce a concentrated carbon dioxide product stream.

21. The method of claim 20, wherein the step of separating the carbon dioxide from the loaded sorbents comprises the steps of:

passing the loaded sorbents to the oxidizer module;

heating the loaded sorbents in the oxidizer module with the combustion of the volatile pollutants-air mixture within the oxidizer module to produce the concentrated carbon dioxide product stream while regenerating the sorbents.

\* \* \* \* \*